United States Patent [19]

Stenne

[11] 3,899,596
[45] Aug. 12, 1975

[54] METHOD FOR THE MANUFACTURE OF CHEESES

[75] Inventor: Pierre Stenne, Lozon, France

[73] Assignee: Claudel S.A., Courbevoie, France

[22] Filed: Apr. 10, 1974

[21] Appl. No.: 459,594

[30] Foreign Application Priority Data

Apr. 16, 1973 France .............................. 73.13767
Aug. 16, 1973 France ............................ 73.29866

[52] U.S. Cl. ................... 426/40; 426/188; 426/361
[51] Int. Cl. .............................................. A23c 19/02
[58] Field of Search ........ 426/36, 40, 150, 188, 361

[56] References Cited
UNITED STATES PATENTS

| | | | |
|---|---|---|---|
| 3,132,026 | 5/1964 | Radema et al. | 426/36 |
| 3,528,821 | 9/1970 | Steene | 426/40 |

*Primary Examiner*—A. Louis Monacell
*Assistant Examiner*—R. A. Yoncoskig
*Attorney, Agent, or Firm*—Kenyon & Kenyon Reilly Carr & Chapin

[57] ABSTRACT

A process for the production of cheese which comprises treating milk by ultrafiltration to obtain a liquid product containing at least some of the protein constituents of the milk, subjecting this liquid to a heat treatment to bring it to the coagulation temperature, renneting the liquid product after inoculation with suitable ferments, introducing a batch of the renneted liquid into at least one vertical chamber in which it is left to coagulate in the stationary phase until a coherent mass is obtained, displacing the coagulated mass obtained upwards under the effect of a pressure uniformly distributed over the base of the mass, and cutting unit slabs of coagulum which will each constitute a cheese at the top of the chamber after the mass has emerged by a predetermined height.

10 Claims, 3 Drawing Figures

METHOD FOR THE MANUFACTURE OF CHEESES

This invention relates to the production of cheese and, more particularly, to the production of cheese intended to be sold by the piece.

Conventional processes for the production of cheese generally involve a succession of batch operations, such as the coagulation of milk in suitable containers, cutting of the coagulum formed and transfer of the resulting slabs of coagulum to drainage moulds. This traditional method is attended by various disadvantages, including poor reproducibility of the physicochemical characteristics of the products obtained, and the difficulty of rationalising the various process stages. In addition, in the particular case of manufacturing cheese intended to be sold by the piece, i.e. in units of substantially equal volume, but whose weight is subject to variations in dependence upon the characteristics of the product, it is necessary to employ special means. Thus, coagulation can be carried out in microvats from quantities of milk determined as accurately as possible, cutting being carried out in these microvats. Unfortunately, it is not possible by this method satisfactorily to reduce the variations between the weights of the cheeses obtained. This variation, which is generally expressed in terms of a standard deviation, remains one of the major problems of the cheese industry.

Attempts have been made to rationalise cheese production by developing continuous or semi-continuous transforming processes, more especially by carrying out the coagulation of milk in tubular coagulation chambers through which the product is continuously passed. Unfortunately, it is not possible by these processes to obtain unit slabs of coagulum whose dimensions are similar to those of the required cheese. This is because the coagulum collected at the output end of a continuous coagulation tube has to be subsequently subjected to drainage and moulding. Semi-continuous processes have also been proposed, in which the cold renneted milk is introduced into tubes in which it is heated and coagulated and then discharged from these tubes. However, processes of this kind are limited to the production of small-diameter cylinders of curd, because the need for heating involves the use of coagulating tubes no more than a few tens of millimetres in diameter, which makes it impossible to transform slabs of curd whose dimensions are similar to those of a cheese. On the other hand, none of these processes, whether continuous or semi-continuous, enables the standard deviation between the weights of the products obtained to be satisfactorily reduced.

The present invention relates to a process for the production of cheese by which it is particularly easy to obtain slabs of coagulum which have the volume required for obtaining a cheese and whose respective weights show a greatly reduced variation. The invention provides a process in which a milk is treated by ultrafiltration to obtain a liquid product containing at least some of the protein constituents of the milk i.e., a higher protein content than that of the milk being treated, the liquid thus obtained is subjected to a heat treatment to bring it to the coagulation temperature, the liquid product is renneted after inoculation with suitable ferments, a batch of the renneted liquid is introduced into at least one vertical chamber in which it is left to coagulate in the stationary phase until a coherent mass is obtained, the coagulated mass thus obtained is displaced upwards by a pressure distributed uniformly over the base of the mass, and unit slabs of coagulum which will each constitute a cheese are then cut at the top of the chamber after they have emerged by a predetermined height.

The invention also relates to an installation for carrying out the process described above.

The expression "a milk is treated by ultrafiltration to obtain a liquid product containing at least some of the protein constituents of the milk" means that the milk is separated by filtration through at least one semipermeable membrane into two liquid fractions of different chemical composition, and that the retained fraction, whose protein content has been appreciably increased, is collected. The other fraction, known generally as the permeate, consists of an aqueous solution containing substances of relatively low molecular weight, such as lactose, mineral salts and certain nitrogen-containing substances. The production by ultrafiltration of a fraction enriched with proteins, whose content by weight of non-fat solids is not less than 18% for example, generally necessitates several successive ultrafiltration operations which can be carried out either by arranging an adequate number of semipermeable membranes in the path followed by the milk, or by recycling the milk into the ultrafiltration unit as many times as is necessary.

Although this ultrafiltration treatment can be carried out with whole milk, it is generally preferred to use skimmed milk in order to avoid over-frequent clogging of the semi-permeable membranes. Ultrafiltration can be carried out with membranes whose permeability is such that the low molecular weight constituents of the milk (lactose, minerals salts, non-protein nitrogen-containing substances) are able to pass through them, whilst the constituents of higher molecular weight, notably casein, are retained. Commercially available membranes can be used for this purpose, for example those which are designed to isolate proteins from whey by ultrafiltration. Membranes of this kind can be made of cellulose acetate or of synthetic polymers such as, for example, polyvinyl chloride or polyacrylonitrile.

The ultrafiltration unit can comprise porous tubes arranged in bundles, the inner or outer surface of these tubes being covered by the semi-permeable membrane. The ultrafiltration unit can also be formed by porous plates each supporting a semi-permeable membrane and mounted in adjacent frames providing for a suitable interval between the plates. These various types of apparatus are also available on the chemical industry market.

The milk is brought into contact with the semi-permeable membranes. The treatment is carried out under pressure and, preferably, under turbulence in order to avoid polarisation phenomena which adversely affect the efficiency of the operation. The temperature of the milk during ultrafiltration is not a critical parameter providing it remains compatible with the viscosity requirements of the milk or does not affect the integrity both of the treated product and of the semi-permeable membranes. This temperature can be adjusted to a value in the range from 2°C. to 70°C, depending upon the initial viscosity, and may be progressively increased as the viscosity of the product increases.

If the liquid product has been prepared by ultrafiltration of skimmed mil, a suitable quantity of one or more edible fats can be added to the skimmed milk. These fats can be of animal origin (for example dairy cream or butter oil), or of vegetable origin (for example peanut oil). The appropriate quantity of fat, selected in dependence upon the type of cheese required, can be for example of the order of 45 to 50% of the weight of the total solids which will be retained in the cheese.

The liquid product, referred to hereinafter as "ultrafiltered milk," is then heated to the actual coagulation temperature, in the range from 25° to 50°C, inoculated with suitable lactic ferments and then renneted. Ferments of this kind are well known to the expert, so that there is no need to describe them in detail here.

In one embodiment, the ultrafiltered milk can be inoculated before it is heated to the coagulation temperature.

The ultrafiltered milk, inoculated and heated to the appropriate temperature, is then renneted and introduced into a vertical chamber. This vertical chamber can have a constant cross section substantially equal to that of the required cheese, its volume preferably corresponding to several times the volume of each of the unit slabs to be obtained. The cross-section of the vertical chamber can be circular, elliptical or polygonal, depending upon the shape of the cheese to be produced. Liquid product is then introduced into the chamber in a quantity which, expressed in terms of weight for example, is preferably several times the weight of each of the aforementioned unit slabs, after which introduction is stopped and the batch allowed to remain in the chamber for a residence time sufficiently long for the product to coagulate and form a coherent mass. In the context of the invention, a "coherent mass" is a coagulated mass whose consistency and cohesion are sufficient to enable the mass to be displaced inside the chamber under the effect of a pressure applied uniformly to its base, and then cut and handled without adversely affecting the integrity of the coagulum. The consistency and cohesion of this mass are also governed by the non-fat solids content of the ultrafiltered milk.

In one embodiment of the process according to the invention, the ultrafiltered milk has a non-fat solids content of at least 18% by weight. Tests have shown that the firmness of slabs obtained from an ultrafiltered milk with a non-fat solids content of less than 18% by weight is not always sufficient, and does not allow the slabs to be readily handled without the integrity of the coagulum being affected. However, this does not necessarily mean that the consistency of this mass is not capable of developing, or that it has reached a degree of development corresponding to maximum hardness.

When the coagulated batch has reached the appropriate consistency and cohesion, i.e. some 10 to 40 minutes after renneting of the ultrafiltered milk, depending upon the characteristics of the product and, in particular, upon its non-fat solids content, it is gradually displaced upwards in the chamber by applying a uniformly distributed mechanical pressure to its base. This pressure can be applied by any known means enabling this operation to be carried out, for example by a piston operated by mechanical, hydraulic or pneumatic transmission.

The ultrafiltered, renneted milk can be introduced into the coagulation chamber directly at its upper end or through a conduit extending through the lateral wall of the chamber at a level higher than that occupied by the piston at the beginning of introduction of the product. In one particularly advantageous embodiment, the batch of ultrafiltered, renneted mil, is introduced at the upper end of the chamber, whilst the piston redescends into its lowermost position. This method of filling, which enables the chamber to be filled and the piston to descent in a single operation, preferably takes place at such a rate that the liquid level remains substantially constant and close to the introduction or admission level so as to avoid movement in the product which could give rise to foaming. Naturally, the adjustment of the piston in the coagulation chamber is such that it provides for adequate liquid-tightness, thus preventing any loss of liquid. The seal can be made liquid-tight by using a piston fitted with one or more annular segments cooperating with the inner surface of the coagulation chamber.

Under the effect of the pressure applied to it by the piston, the coagulated mass moves through the coagulation chamber. It emerges progressively from the upper end of the coagulation chamber and is cut or sliced into unit slabs of coagulum after it has emerged by a predetermined height. The thickness of the slabs is adjusted in dependence both upon the cutting frequency and upon the rate of vertical displacement of the mass of coagulum. The cutting unit can be controlled by a means for measuring the height of curd mass emerging from the chamber, for example in the form of a sensor or photoelectric cell. The coagulum can be cut by any suitable means such as a wire or blade moving in a horizontal or slightly inclined plane so that the cutting plane is substantially horizontal in view of the continuous displacement of the coagulated mass. In one embodiment, the cutting means can be in the form of a series of wires or blades mounted at regular intervals on a frame which is uniformly displaced or rotated to enable it to cut slabs of the same thickness.

The slabs can be separated and collected in suitable moulds whose dimensions are preferably slightly larger than those of the slabs. Once inside the moulds, the slabs are gradually deformed into the geometry of the moulds and each forms a cheese of predetermined weight. It is also possible, when the consistency of the coagulated mass is sufficient, to deposit the slabs of coagulum onto flat surfaces. In another embodiment of the process, the mass of coagulum is sliced without the slabs being separated and, continuing its vertical displacement in the form of a stack of unit elements, enters a second vertical chamber of identical cross section arranged in line with the coagulation chamber. This second chamber can then be used as a storage and transport facility for a number of unit slabs of coagulum. The use of this particular embodiment, which necessitates more or less prolonged contact of the unit slabs of curd, is made possible by the substantial inability of the curd to reintegrate spontaneously.

The slabs of coagulum collected in the moulds, although still losing a certain quantity of serum, of the order of 7 to 30% by weight, depending upon the solids content of the coagulum obtained, do not necessitate conventional draining operations (which generally correspond to the elimination of approximately 85% by weight of serum). They are then subjected to the conventional cheese-forming operations, such as acidification, ripening and maturing.

In a second embodiment of the process, the ultrafiltered milk has a non-fat solids content of no more than 18% by weight. In this case, the process generally comprises cutting of the unit slabs of coagulum. The sliced slabs are preferably collected in suitable moulds in which, according to one particularly advantageous embodiment, they are cut in a regular manner. Although not absolutely essential, this cutting stage is generally carried out in such a way as to produce similar portions. Thus, for example by the action of blades and/or wires in three orthogonal directions, it is possible to obtain cubes of curd each with the same volume, except possibly for "peripheral cubes." Depending upon the thickness of the slabs to be fragmented, there may be no need to cut in the direction of the thickness.

The cut slabs are then left to drain, losing up to 70% by weight of serum, and then to reintegrate. It is in consideration of this loss that the expression "volume required to obtain a cheese" should be interpreted. For example, slabs weighing 800 g have to be cut and then fragmented to obtain a cheese weighing 300 g if draining is reflected by a loss of 62.5% by weight of serum.

In another embodiment, the slabs are collected on a flat surface, subjected to cutting on that surface and are only moulded after draining has commenced before the curd has had time to reintegrate. One particularly interesting application of this embodiment is based on the use of a conveyor which collects the slabs, carries them below a cutting unit and then discharges each of the slabs into an individual mould through a hopper.

The moulded curd is then subjected to the conventional cheese-forming operations, such as acidification, inoculation, ripening, maturing.

The process according to the invention can of course be carried out by means of one or more coagulation chambers fed with batches of ultrafiltered, renneted milk and producing slabs of coagulum at regular intervals. However, this process lends itself with particular advantage to the continuous production of slabs of curd from a continuous input of ultrafiltered milk by means of several coagulation chambers which are fed and operate in predetermined sequences. One embodiment of the process using this sequential principle, and an installation for carrying it out, are described in detail in the following.

The accompanying drawings illustrate one embodiment of an installation according to the invention.

FIG. 1 diagrammatically illustrates the installation as a whole.

Figure 1:
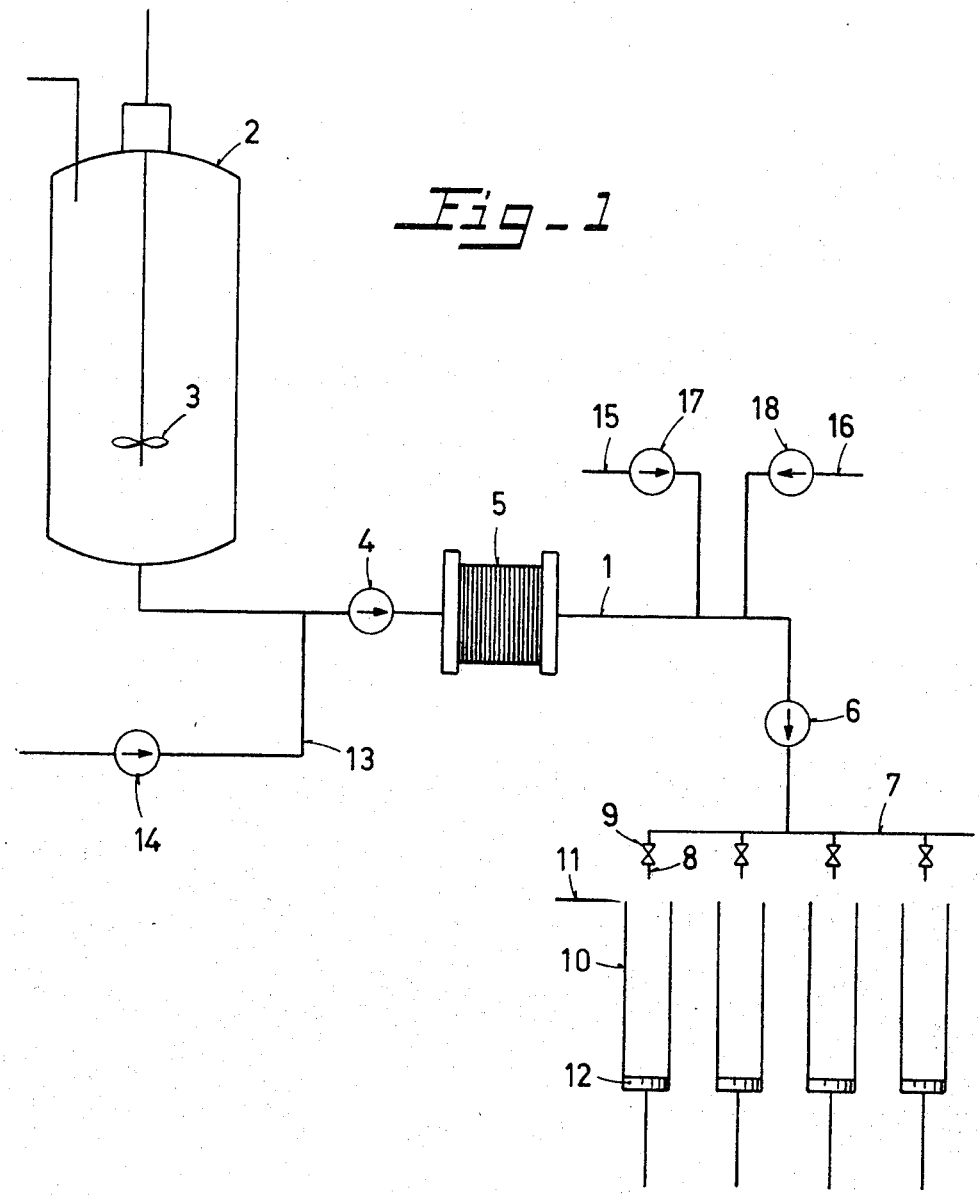

As shown in FIG. 1, the installation comprises a certain number of components arranged in series and interconnected by a pipe 1. These components, listed in the order in which they are arranged downstream, are as follows:
- a storage tank 2 equipped with a stirrer 3 and a device for maintaining a constant temperature (not shown);
- a centrifugal pump 4;
- a plate heater 5;
- a centrifugal pump 6;
- a distributor 7 comprising several feed pipes 8 each fitted with a valve 9;
- a group of several vertical coagulation chambers 10 each fed with ultrafiltered, renneted milk from the distributor 7 through a pipe 8. Each coagulation chamber is equipped with a cutting unit 11 and a piston 12. These chambers are illustrated in detail in FIG. 2.

The installation also comprises a pipe 13 equipped with a variable-output pump 14 and connected to the pipe 1 between the tank 2 and the centrifugal pump 4. The appropriate quantity of fat can be continuously added to the ultrafiltered milk through this pipe 13. In addition, the installation comprises two pipes 15 and 16 connected in parallel to the pipe 1 between the heater 5 and the centrifugal pump 6. These pipes 15 and 16, equipped with metering pumps 17 and 18, are used for continuously introducing the appropriate quantities of lactic ferments and rennet.

Figure 2:
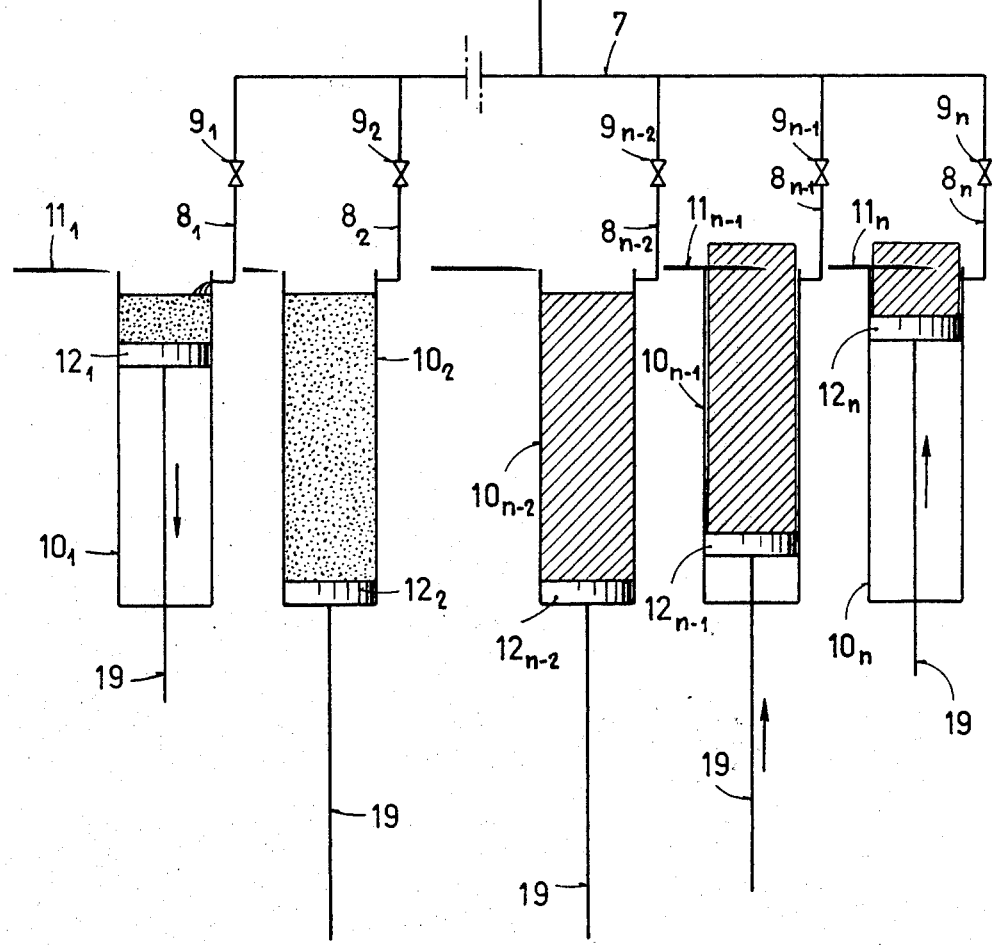
FIG. 2 is a plan illustrating the operation of a group of coagulation chambers.

The actual coagulation and cutting system illustrated in FIG. 2 comprises a series of $n$ identical vertical caoagulation chambers, for example in the form of tubes made of stainless steel or of a rigid polymer. These chambers, numbered $10_1, 10_2, \ldots, 10_n$, are equipped with pistons $12_1, 12_2, \ldots, 12_n$ displaced vertically by means of push rods 19 associated with drive units, such as jacks (not shown). Each of these chambers 10 is fed with ultrafiltered milk through a pipe 8 equipped with a valve 9, the pipes 8 and their valves 9 being denoted by the index $1, 2, \ldots n$ of the corresponding chamber. In addition, a cutting unit $11_1, 11_2, \ldots, 11_n$ is arranged above each of the chambers 10.

If it is desired to operate the installation continuously, i.e. by feeding the coagulation system with a continuous supply of ultrafiltered milk, it is advisable to arrange the working sequences of the chambers in such a way that, when the filling of one chamber is complete, another chamber is ready for refilling. The various working sequences of one chamber are, in chronological order, the following:
- filling and simultaneous descent of the piston, Duration $T_r$;
- stationary-phase coagulation until a coherent mass is obtained. Duration $T_c$;
- upward displacement of the coagulated mass, accompanied by cutting and production of curd slabs. Duration $T_p$.

Accordingly, if the installation is to operate continuously, coagulation and slab production in a given chamber should take place entirely during filling of the other n-1 chambers. This condition is expressed very simply by the expression $T_c + T_p \leq (n-1) T_r$.

The duration $T_c$ is a parameter which is essentially governed by the chemical composition of the ultrafiltered milk (in particular its solids content), its renneting, its acidification and its temperature (especially during renneting). It is generally of the order of 10 to 40 minutes.

The duration $T_r$ is of course governed both by the input of ultrafiltered milk and by the volume of each chamber. It can be selected and adjusted with precision.

Similarly, the duration $T_p$ can be selected and adjusted in conjunction with the cutting frequency and the required thickness of the slabs by regulating the rate of displacement of the pistons.

Accordingly, it is readily possible, if $T_c$, $T_p$ and $T_r$ are known, to determine the number of coagulation chambers required to ensure continuous operation of the installation or, for a predetermined number of chambers, to adjust the duration of the various sequences, especially the filling sequence.

FIG. 2 illustrates by way of example the state of the working sequences, at a given instant, of five of the $n$ chambers of the coagulation installation. The chamber $10_1$ is in the course of being filled. The valve $9_1$ is open and the piston $12_1$ is moving downwards. The chamber $10_2$ is filled with ultrafiltered, renneted milk and is in the initial phase of coagulation. Accordingly, the valve $9_2$ is closed and the piston $12_2$ stationary in its lowermost position. The chamber $10_{n-2}$ is closed and the piston $12_{n-2}$ is stationary in its lowermost position. The chambers $10_{n-1}$ $10_n$ are in different stages of production (the end of the production phase of chamber $10_n$ coincides with the end of the filling phase of chamber $10_1$). The pistons $12_{n-1}$ and $12_n$ are in the course of ascent and displace the coagulated masses which are sliced by the units $11_{n-1}$ and $11_n$ as they emerge from the chambers. The valves $9_{n-1}$ and $9_n$ are closed.

It is of course possible to link operation of the valves 9, the pistons 12 and the slicing units 11 to a programmed control system to organise the working sequence as a function of the times $T_r$, $T_p$ and $T_c$. This control system can also function on the basis of signals delivered by devices for measuring the level reached by the ultrafiltered milk in the chambers and/or for measuring the level of the pistons.

The process according to the invention is illustrated in, but by no means limited to, the following Examples, in which contents and percentages are expressed in terms of weight, the installation used being of the type illustrated in FIGS. 1 and 2.

EXAMPLE 1

1000 litres of skimmed milk containing 9% of non-fat solids whose composition is as follows:

| | |
|---|---|
| lactose | 5.0% |
| mineral salts | 0.7% |
| casein | 2.6% |
| soluble proteins | 0.7% | are treated by ultrafiltration.

This treatment is carried out in an installation comprising 10 ultrafiltration subassemblies in series, each subassembly consisting of five porous plates arranged parallel to one another and supporting on their two faces a semi-permeable membrane with a surface area of 0.1 m². This ultrafiltration system is manufactured by Messrs. Rhone-Poulenc (Paris), and the membranes, with a total surface area of 10 m², are marketed under the name "type Iris 3069." The skimmed milk is introduced into the ultrafiltration system at a rate of 6000 litres per hour, which enables suitable turbulent conditions to be established, and recycled into this system for a period of 10 hours through a buffer tank. The 185 litres of ultrafiltered milk collected in the buffer tank are transferred to the tank 2 where they are stored at 20°C. This ultrafiltered milk has the following composition:

| | |
|---|---|
| lactose | 5.0% |
| mineral salts | 0.7% |
| casein | 15.6% |
| soluble proteins | 4.2% |

The ultrafiltered milk is then introduced at a rate of 100 litres per hour into the conduit 1 where diary cream containing 60% of fat is added to it. This addition is made continuously through the pipe 13 by means of the pump 14 at a rate of 30 litres per hour of cream.

The ultrafiltered milk with fat added to it, delivered by the centrifugal pump 4, is heated to 35°C in the plate heater 5. 2% by volume of a lactic starter consisting of an association of *Streptococcus lactis*, *Streptococcus cremoris*, *Leuconostoc citrovorum* and *Streptococcus diacetyllactis*, and on the other hand, 26.5 cc/hr of a 1/10,000 rennet, are then continuously introduced into the ultrafiltered milk by means of metering pumps 17 and 18. The starter, the rennet and the ultrafiltered milk are thoroughly mixed after the product has passed through the centrifugal pump 6. The ultrafiltered, inoculated and renneted milk is then delivered through the distributor 7 into seven vertical coagulation chambers in the form of tubes with an internal diameter of 110 mm and a free height (without piston) of 102.5 cm. The parameters defining the working sequences are as follows:

| | |
|---|---|
| - filling time | : 4 minutes 20 seconds |
| - coagulation time for the production of a coherent mass | : 20 minutes |
| - slab production time | : 4 minutes 10 seconds for a piston advance of 24.6 cm/minute and a cutting frequency of 1 slab every 10 seconds. |

Figure 3:
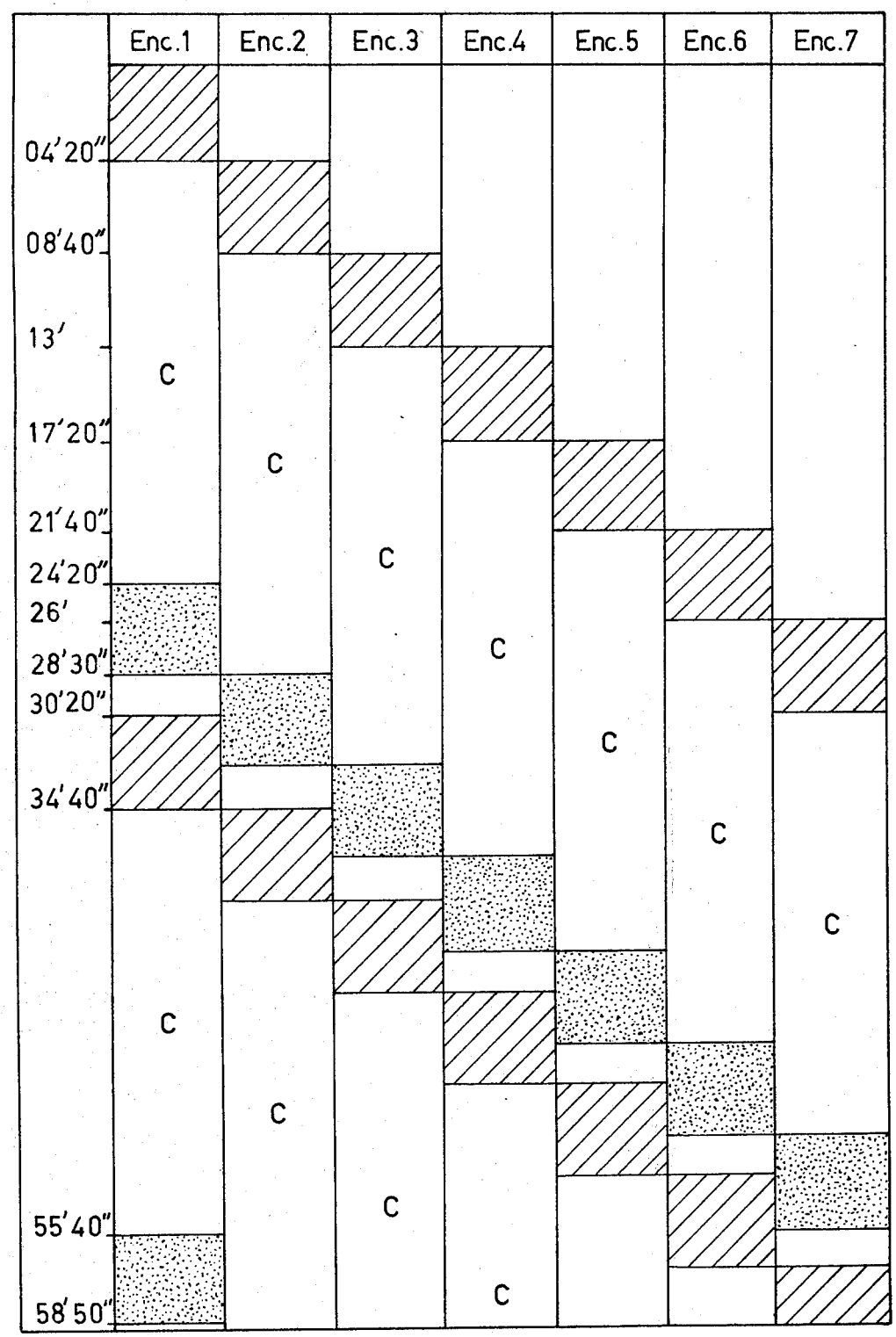
FIG. 3 is a diagram explaining the sequences of operation of the installation.

The working sequences are explained by the diagram in FIG. 3. The filling sequences are represented by hatched zones, the production sequences by dotted zones and the coagulation sequences by blank zones denoted by the referene C.

In this way, slabs of coagulum 110 mm in diameter and 4.1 cm thick are obtained by successive periods of 4 minutes 10 seconds, separated by a 10 seconds inerval, at a rate of one slab every 10 seconds. The dead time of 10 seconds can of course be eliminated by equalising the filling and production times.

During the time interval between the end of production of one chamber and the commencement of its filling, ile. 1 minute 50 seconds, the piston begins its descent to reach a level lower than that of the opening of the pipe 8.

The unit slabs of coagulum, cut by means of a wire cutter, weigh 390 g and their respective weights show variations of less than 1%. They are removed and deposited into suitable moulds and then undergo the usual cheese-making operations.

EXAMPLE 2

Slabs of coagulum are continuously produced from 280 litres of an enriched milk containing 18.3% of non-fat solids, prepared by the ultrafiltration of 1000 litres of skimmed milk containing 9% of non-fat solids whose gravimetric composition is identical with that of the milk used in Example 1.

The ultrafiltration treatment is carried out for 8 hours in the same way, and using the same system, as described in Example 1. The 280 litres of ultrafiltered milk are transferred to the tank 2 where they are stored at 20°C. This ultrafiltered milk has the following composition:

| | |
|---|---|
| lactose | 5.0% |
| mineral salts | 0.7% |
| casein | 9.9% |
| soluble proteins | 2.7% |

Dairy cream containing 60% of fat is added at a rate of 17 litres per hour of cream to the ultrafiltered milk, introduced into the conduit 1 at a rate of 100 litres per hour, through the pipe 13 and the pump 14.

The ultrafiltered milk enriched with fat, delivered by the centrifugal pump 4, is heated to 35°C in the heater 5. 2% by volume of the lactic starter described in Example 1 and 23.5 cc/hour of a 1/10,000 rennet are then continuously added by means of the metering pumps 17 and 18. The starter, the rennet and the ultrafiltered milk are thoroughly mixed after the product has passed through the centrifugal pump 6. The ultrafiltered, inoculated and renneted milk is then introduced through the distributor 7 into nine vertical coagulation chambers in the form of tubes with an internal diameter of 110 mm and a free height (without piston) of 93 cc. The parameters defining the working sequences are as follows:

| | |
|---|---|
| - filling time | : 4 minutes 25 seconds |
| - coagulation time for producing a coherent mass | : 30 minutes |
| - slab production time | : 4 minutes 15 seconds for a piston advance of 21.6 cm/minute and a cutting frequency of one slab every 17 seconds. |

In this way, slabs of coagulum 110 mm in diameter and 61.2 mm thick are obtained by successive periods of 4 minutes 15 seconds, separated by 10 second intervals, at a rate of one slab every 17 seconds. These slabs of coagulum weigh 589 g and their respective weights show variations of less than 0.6%.

These unit slabs are deposited in suitable moulds and then undergo the usual cheese-forming operations.

EXAMPLE 3

Slabs of coagulum are produced from 14.1 litres of milk containing 14% of non-fat solids, taken from 141 litres of the same milk prepared by ultrafiltration of 350 litres of skimmed milk containing 9% of non-fat solids.

The treatment is carried out in a module comprising 10 ultrafiltration subassemblies in series, each subassembly being formed by five porous plates arranged parallel to one another and supporting on their two faces a semi-permeable membrane with a service area of 0.1 m². This ultrafiltration module is manufactured by Messrs. Rhone-Poulenc (Paris) and the membranes, with a total service area of 10 m², are marketed under the name "type Iris 3069". The skimmed milk is introduced into the ultrafiltration module at a rate of 170 litres per minute, which enables suitable turbulence conditions to be established, and recycled into this module through a buffer tank. 141 litres of an ultrafiltered milk containing 14% of non-fat solids are collected after 2.5 hours' operation. Of that 141 litres, 14.1 litres are removed and 2.1 litres of a cream containing 410 g of fat per litre are added. The mixture is heated to 35°C in a plate heater, followed by the introduction of 320 cc of starter consisting of an association of *Streptococcus lactis*, *Streptococcus cremoris*, *Leuconostoc citrovorum*, and *Streptococcus diacetyllactis*, and of 3.2 cc of a 1/10,000 rennet. After thorough mixing, the mixture is poured into a vertical chamber with an internal diameter of 14.4 cm and available height of 101 cm. The mixture is allowed to harden for 20 minutes, a uniform pressure is applied at the base of the vertical chamber and slabs of coagulum are cut by means of a scraper. The pressure is applied in such a way that, for a 10 second interval between each cutting stroke, a slab 5.5 cm tall, corresponding to a volume of 900 ml is obtained, the chamber thus supplying a total of 18 slabs. Each slab is deposited by the scraper in an inclined position onto a conveyor of the endless-belt type. Cutting into approximately 3 × 3 cm fragments is carried out by means of an assembly of four blades alternately in the direction of travel of the endless belt and then in a perpendicular direction. This is followed by mounding, each slab of curd being deposited into a hopper below which a mould is arranged. Drainage takes between 20 and 24 hours, during which the curd reintegrates, after which cheese formation takes place in the usual way.

We claim:

1. A process for the production of cheese which comprises treating milk by ultrafiltration to obtain as a retained fraction a liquid product having a higher protein content than that of the milk, subjecting this liquid to a heat treatment to bring it to the coagulation temperature, renneting the liquid product after inoculation with suitable ferments, introducing a batch of the renneted liquid into at least one vertical chamber in which it is left to coagulate in the stationary phase until a coherent mass is obtained, displacing the coagulated mass obtained upwards under the effect of a pressure uniformly distributed over the base of the mass, and cutting unit slabs of coagulum which will each constitute a cheese at the top of the chamber after the mass has emerged by a predetermined height.

2. A process according to claim 1, wherein the ultrafiltered milk is accommodated in a tank, a series of coagulation chambers each provided with a piston and functioning in predetermined sequences are fed in sequence from the tank with a continuous supply of product, the heat treatment, inoculation and renneting being carried out continuously.

3. A process according to claim 2, wherein, for each chamber, filling of the chamber from above and descent of the piston to its lowermost position take place simultaneously.

4. A process according to claim 1, wherein a skimmed milk is treated by ultrafiltration and a predetermined quantity of edible fat is continuously added to the ultrafiltered milk before the heat treatment.

5. A process according to claim 2, wherein the vertical chamber has a constant cross-section whose surface area is substantially equal to the surface area of the required cheese.

6. A process according to claim 5, wherein the unit slabs of coagulum are deposited into moulds.

7. A process according to claim 1, wherein the slabs of coagulum are cut without being separated so as to form, above the coagulation chamber, a stack of unit slabs, this stack being introduced into a container arranged in line with the aforementioned chamber.

8. A process according to claim 1, wherein the liquid product has a non-fat solids content of at least 18% by weight.

9. A process according to claim 1, wherein the liquid product has a non-fat solids content of not more than 18% by weight, and the slabs of coagulum are cut to facilitate drainage of serum.

10. A process as claimed in claim 9, wherein the liquid product has a non-fat solids content of about 14% by weight.

* * * * *